United States Patent [19]

Schmidt

[11] 4,301,179

[45] Nov. 17, 1981

[54] BREAD PROCESS USING MILK SUBSTITUTE

[75] Inventor: Edward D. Schmidt, Bloomington, Minn.

[73] Assignee: Dumas Seed Company, Moscow, Id.

[21] Appl. No.: 61,370

[22] Filed: Jul. 27, 1979

[51] Int. Cl.³ .............................................. A21D 2/36
[52] U.S. Cl. ....................................... 426/19; 426/21; 426/583; 426/653
[58] Field of Search .................. 426/19, 583, 634, 653, 426/21

[56] References Cited

U.S. PATENT DOCUMENTS

| | | | |
|---|---|---|---|
| 1,580,487 | 4/1926 | Heimerdinger | 426/19 |
| 2,555,514 | 6/1951 | Sharp et al. | 426/583 |
| 3,780,188 | 12/1973 | Isen et al. | 426/653 |
| 3,873,751 | 3/1975 | Arndt | 426/583 |
| 3,941,895 | 3/1976 | Ash | 426/583 |

OTHER PUBLICATIONS

"The Pro-Star Story," An 11 Page Brochure Published by Pro Star Mills, Ltd., 1978, pp. 1-11.

*Primary Examiner*—Joseph M. Golian
*Assistant Examiner*—Elizabeth A. Hatcher
*Attorney, Agent, or Firm*—Bell, Seltzer, Park & Gibson

[57] ABSTRACT

The present invention relates to a bread dough for standard white bread which incorporates pea flour in an amount between about 2% to 3%. It has been discovered that pea flour in such a relatively small amount acts to substantially reduce dough mixing time, to increase fermentation aroma, and to obtain improved taste in the bread, and yet it does not destroy the well recognized character of the baked product as standard white bread. The present invention also relates to a milk substitute for use in bread which consists essentially of a dry blend of pea flour and whey. Bread dough having the pea-whey milk substitute is not only characterized by reduced mixing and fermentation times, but also the resulting baked bread has been found to have a superior crust color and crumb structure.

2 Claims, No Drawings

BREAD PROCESS USING MILK SUBSTITUTE

The present invention relates to a bread dough characterized by substantially reduced dough mixing and fermentation times, and by improved bread quality.

Bread has long been produced by mixing together flour, water, yeast or other leavening agent, yeast food, salt, sugar, and shortening, permitting the yeast to ferment the mixture, and then baking the resulting dough. It is also common to incorporate milk, or nonfat dry milk solids in the bread formulation for the purpose of improving the handling characteristics of the dough, as well as the characeristics of the baked bread, such as crust color, texture, crumb quality and grain. In order to reduce the cost associated with the use of milk or nonfat dry milk in bread, various low cost milk substitutes have been developed for use primarily by commercial bakeries. Sweet dairy whey is one commonly used ingredient in such milk substitutes, and it is often blended with soy or corn flour or milk proteins. The soy provides added protein, while corn flour provides additional liquid absorption.

Dough conditioners have also been added to the bread ingredients for the purpose of reducing dough mixing times, and which comprise various chemicals, such as ascorbic acid, or a blend of L cysteine and potassium bromate. However, these conditioners are not altogether satisfactory since they add to the cost of the bread, and they non-natural ingredients.

There are at present a number of differing procedures for producing bread in commercial quantities, including the sponge-dough process wherein a sponge is initially prepared by mixing and fermenting a portion of the flour, yeast and other ingredients, and then adding the balance of the ingredients to form the dough, which is again fermented and then baked. In the straight-dough process, all ingredients are mixed together at one time, and there is only one fermentation period, typically three to four hours, prior to baking. The "no-time" process is the same as the straight-dough process, but with a shorter fermentation time, which is typically about one-half hour. The "no-time" procedure is thus quicker, but at a sacrifice in taste resulting from the limited fermentation time. As a fourth conventional bread producing procedure, a continuous process has more recently been developed, and which is characterized by a continuous operation, from the weighing of ingredients until the bread is baked.

Breads are also classified according to the type of flour or ingredients employed, and the requirements for specific standarized bakery products are published in the Code of Federal Regulations. For example, the requirements for bread, white bread, and rolls or buns are set forth in 21 CRF 136.110. Such bread products, which are hereinafter referred to as standard white bread, consist essentially only of wheat flour, and account for a high percentage of all bread produced in the United States. Also, such standard white bread has a well recognized identity to the purchasing public.

The present invention is directed to the discovery that the addition of relatively small amounts of pea flour to the wheat flour in an otherwise standard bread dough formulation produces surprising functional results. More specifically, it has been found that the addition of at least about 2% and preferably not more than about 3% pea flour (bakers weight) to the wheat flour, substantially reduces dough mixing and fermentation times, and also serves ass a bleaching agent. Thus the added pea flour permits the elimination of dough conditioners of the type heretofore used to reduce mixing time. Finally, in the case of standard white bread, the addition of such relatively small amounts of pea flour does not cause the resulting bread to lose its recognized identity.

In accordance with the present invention, it has been found that the pea flour may be incorporated into the dough by premixing it with any of the other regular ingredients, prior to adding water and mixing. However, it is preferred to incorporate the pea flour as part of a milk substitute which consists of dry premixed pea flour and sweet dairy whey, since it has been found that such premixing results in further unexpected advantages, including an improved crust color, and a more silky texture in the finished bread. The amount of pea flour added preferably is between about 2% and 3%, since an amount below about 2% does not provide the desired significant functional results, and an amount greater than about 3% is undesirable in the case of standard white bread in that such amount tends to cause the bread to lose its recognized identity or appearance as white bread to the purchasing public. Also, the presence of more than 3% non-wheat flour causes the bread to lose its trade identification as defined at 21 CFR 136.110.

It is accordingly an object of the present invention to provide a dough product and a method of making the same, which is characterized by substantially reduced mixing and fermentation times.

It is also an object of the present invention to provide a dough product and method for making bread which is characterized by a relatively short fermentation time, with little or no sacrifice in taste, and which is applicable to any of the conventional bread making procedures, including the sponge-dough, straight-dough, "no-time," and continuous processes.

It is a more specific object of the present invention to provide a dough formulation for standard white bread which includes an all natural ingredient which serves to reduce mixing and fermentation times, and which does not alter the identity of the resulting baked product as standard white bread.

It is also a specific object of the present invention to provide a milk substitute for bread which results in reduced mixing and fermentation times, and which also produces a high quality bread.

For the purpose of describing the present invention in more detail, a series of tests involving the use of pea flour in bread in accordance with the present invention, were conducted, and the results are set forth in Tables I, II, and III. The tests involved the preparation and evaluation of twenty-six samples of bread dough, with samples 1 through 17 relating to breads produced by the sponge-dough procedure, and samples 18–26 relating to the "no-time" procedure. As indicated in Table I, samples 1–4 and 9–26 were prepared from normal bakers patent flour having a protein content of 11.4%, and samples 5–8 were prepared from a very strong bakery grade flour with a protein content of 14.5%. The pea flour employed consisted of ground dry raw yellow field peas.

Samples 1, 5, 9, 10, 11, 17 and 18 represent standard or conventional bread formulations. More particular, samples 1, 9, and 17, which were identical, comprised the following ingredients:

|  | % (bakers weight) |
| --- | --- |
| Sponge |  |
| Wheat flour | 70 |
| Water | 44.1 |
| Yeast | 2.5 |
| Mineral yeast food | .5 |
| Dough |  |
| Wheat flour | 30 |
| Water | 18.9 |
| Salt | 2.0 |
| Sucrose | 6.0 |
| Nonfat dry milk | 2.0 |
| Shortening | 3.0 |

Sample 5 comprised the above ingredients, but contained a wheat flour of higher protein as indicated above. Samples 10 and 11 were also identical, except that in Sample 10, a commercial vegetable milk substitute composed partially of a defatted soy flour was substituted for the nonfat dry milk, and in Sample 11, an all dairy milk substitute composed of whey, sodium casienate, calcium casienate, and buttermilk, was similarly substituted.

In the sponge-dough tests, 3% pea flour was added to the sponge side in certain of the tests as indicated, and to the dough in the other of the tests, replacing the nonfat dry milk. Also, pea flour samples at 3, 4 and 5% concentrations were evaluated and compared to the various controls to determine whether pea flour can be used to produce bread with similar or improved bread quality. Also included were samples 13 and 14 which varied from the above standard formulation only in the sucrose level as indicated, to determine whether sugar level can be reduced in the presence of pea flour.

In the "no-time" tests, control sample 18 was prepared from the following ingredients:

|  | % (bakers weight) |
| --- | --- |
| Wheat flour | 100 |
| Mineral yeast food | .5 |
| Yeast | 3.5 |
| Water | 64. |
| Salt | 2.0 |
| Sucrose | 6.0 |
| Lard | 3.0 |
| Nonfat dry milk | 2.0 |
| Vinegar | .5 |

Pea flour was added at concentrations of 3, 4, 5, 6, 10 and 15%, in samples 19-24 in place of the nonfat dry milk. One objective of these tests was to determine whether the additions of increasing amounts of pea flour have an improving effect on the flavor of breads produced with essentially no fermentation time.

The tests also included two doughs (samples 25 and 26) prepared with a dry pre-mixed blend of pea flour and dry sweet dairy whey as a milk substitute. Sample 25 contained a 4% blend of three parts pea flour and one part whey, and such that the pea flour constituted 3% (baker's weight) in the overall dough formulation. Sample 26 contained a 4% blend of two parts pea flour and two parts whey, such that the pea flour constituted 2% in the overall bread formulation. One objective of these tests was to permit a comparison of the quality of the bread using straight pea flour and using the pea flour/whey blend. On the day after baking, all breads were scored for internal and external quality characteristics as indicated. In addition, samples 5, 6 and 7 were presented to a taste panel for flavor evaluation on the third day after baking, and samples 18, 19, 20 and 25 were submitted to the taste panel on the fifth day after baking.

The results of these tests demonstrate the surprising fact that 3% pea flour in place of nonfat dry milk will effectively reduce dough mixing times by about 25% in the sponge-dough procedure, and by up to about 50% in the "no-time" procedure. Also, in the sponge-dough tests, it was found that the finished breads appeared normal in all characteristics, and while crust color was slightly lighter than that obtained with some milk replacers, it was very close to that of bread using nonfat dry milk. Thus it was found that the use of pea flour could effectively replace milk or conventional milk substitutes, while gaining a reduction in mixing time. A further advantage found in the use of pea flour was an improvement in fermentation aroma, without an undersirable pea-like flavor characteristic. This finding is particularly significant in the case of the "no-time" procedure, since the development of an adequate aroma in a short fermentation time results in the "no-time" dough having a full flavor development comparable to that found in the longer sponge-dough process.

The test results relating to Samples 19-24 confirmed that the reduction in mixing time was present with increasing levels of pea flour. In this regard, it has been previously determined by others that pea flour could be added to bread in amounts ranging from 5 to 20% for protein supplementation, and that in these amounts, the pea flour acted to reduce mixing time. In the present invention however, the pea flour is added in amounts well below that which would be considered necessary for meaningful protein supplementation, and it results not only in reduced mixing time, but also in the ability to replace conventional milk substitutes and provide improved bread quality. Further, as noted above, the identity of the product as standard white bread was not adversely affected when the pea flour was present at a level not above about 3%. Other tests have been conducted which indicate that at least about 2% pea flour is necessary to obtain the desired significant functional results and properties of the bread as described above.

The premixing of the pea flour and whey for use as a milk substitute was found to produce optimum results, in terms of both a significant reduction in mixing time, and the development of good fermentation aroma in a very short time. Also, the bread resulting from the premixed pea flour and whey exhibited very good crumb structure and a silky texture.

The taste panel results indicated that samples 5, 6, and 7 were of equally good taste. The results with regard to samples 18, 19, 20 and 25 indicated a substantial preference for sample 25, which comprised a three to one blend of pea flour and whey. Thus the pea flour/whey milk substitute results not only in the functional advantages noted above, but it is also preferred because of the improved flavor it is able to impart in the "no-time" system, which typically has poor flavor development in view of the short fermentation time.

A further advantage resulting from the present invention is the fact that pea flour contains lipoxidase, an enzyme which whitens or bleaches bread. Thus a whitening of the bread may also be achieved without the addition of other bleaching agents.

In the drawings and specification, there has been set forth a preferred embodiment of the invention, and although specific terms are employed, they are used in a generic and descriptive sense only and not for purposes of limitation.

TABLE I
EXPERIMENTAL OUTLINE

| Dough No. | Flour Protein | Bread Process | Pea Flour | Control Product |
|---|---|---|---|---|
| 1 | 11.4 | sponge-dough | — | nonfat dry milk @ 2% |
| 2 | 11.4 | sponge-dough | 3% @ sponge | — |
| 3 | 11.4 | sponge-dough | 3% @ dough | — |
| 4 | 11.4 | sponge-dough | 3% @ dough (late addition) | — |
| 5 | 14.5 | sponge-dought | — | nonfat dry milk @ 2% |
| 6 | 14.5 | sponge-dough | 3% @ sponge | — |
| 7 | 14.5 | sponge-dough | 3% @ dough | — |
| 8 | 14.5 | sponge-dough | 3% @ dough (late addition) | — |
| 9 | 11.4 | sponge-dough | — | nonfat dry milk @ 2% |
| 10 | 11.4 | sponge-dough | — | vegetable milk substitute @ 2% |
| 11 | 11.4 | sponge-dough | — | all dairy milk substitute @ 2% |
| 12 | 11.4 | sponge-dough | 3% @ dough | — |
| 13 | 11.4 | sponge-dough | 3% @ dough (−1% sucrose) | — |
| 14 | 11.4 | sponge-dough | 3% @ dough (−2% sucrose) | — |
| 15 | 11.4 | sponge-dough | 4% @ dough | — |
| 16 | 11.4 | sponge-dough | 5% 1E dough | — |
| 17 | 11.4 | sponge-dough | — | nonfat dry milk @ 2% |
| 18 | 11.4 | no-time | — | nonfat dry milk @ 2% |
| 19 | 11.4 | no-time | 3% | — |
| 20 | 11.4 | no-time | 4% | — |
| 21 | 11.4 | no-time | 5% | — |
| 22 | 11.4 | no-time | 6% | — |
| 23 | 11.4 | no-time | 10% | — |
| 24 | 11.4 | no-time | 15% | — |
| 25 | 11.4 | no-time | 3 parts pea flour/1 part whey at 4% | — |
| 26 | 11.4 | no-time | 2 parts pea flour/2 parts whey at 4% | — |

TABLE II
DAY I DOUGH CHARACTERISTICS:

| Dough No. | Total Mix Time (mins.) | Handling Properties | | |
|---|---|---|---|---|
| | | Mixer | Bench | Molder |
| 1 | 4½ | Normal handling properties, no significant differences were noted between doughs. | | |
| 2 | 3¼ | | | |
| 3 | 3¼ | | | |
| 4 | 3¼ | | | |
| 5 | 4 | All dough tended to be slightly tough; no significant differences were noted between doughs. | | |
| 6 | 3 | | | |
| 7 | 3 | | | |
| 8 | 3 | | | |
| 9 | 4½ | Normal | Normal | Normal |
| 10 | 4½ | Normal | Normal | Normal |
| 11 | 4½ | Normal | Normal | Normal |
| 12 | 3¼ | Normal | Normal | Normal |
| 13 | 3¼ | Normal | Normal | Normal |
| 14 | 3¼ | Normal | Normal | Normal |
| 15 | 2½ | Normal | Normal | Normal |
| 16 | 2½ | Sl. Soft (OK) | Sl. Soft (OK) | Sl. Soft (OK) |
| 17 | 4½ | Normal | Normal | Normal |
| 18 | 12 | Normal | Normal | Normal |
| 19 | 6 | (Sl. Soft) OK | Normal | Normal |
| 20 | 7 | (Sl. Soft) OK | Normal | Normal |
| 21 | 6 | Sl. Soft | Sl. Soft | Sl. Soft |
| 22 | 5 | Sl. Soft | Sl. Soft | Sl. Soft |
| 23 | 5 | Sl. Soft | Sl. Soft | Sl. Soft |
| 24 | 5 | Mod. Soft | Sl. Soft | Sl. Soft |
| 25 | 7 | Normal | Normal | Normal |
| 26 | 7 | Normal | Normal | Normal |

TABLES III
BREAD SCORE:

| Bread No. | Average Volume c.c. | Break Shred | Crust Color | Grain | | Texture | Crumb Color | Aroma |
|---|---|---|---|---|---|---|---|---|
| 1 | 2550 | G+ | (Light) G | G+ | | G+ | Normal | G+ |
| 2 | 2508 | G+ | G+ | (Holes) | G | G− | Normal | VG |
| 3 | 2500 | G− | G+ | (Open) | G | G− | Normal | VG− |
| 4 | 2441 | G− | G+ | (Open) | G | G− | Normal | VG− |
| 5 | 2258 | F+ | (Light) G | (Open) | F | F+ | Gray | G+ |
| 6 | 2350 | F+ | G+ | (Open) | F− | G− | Gray | VG |
| 7 | 2500 | G− | G+ | (Holes) | G | G | Normal | VG |
| 8 | 2525 | G− | G+ | (Holes) | G | G+ | Normal | VG |
| 9 | 2533 | G− | (Light) G | | G | G | Normal | G |
| 10 | 2533 | G− | VG− | | G | G | Normal | F |
| 11 | 2583 | G | VG− | | G+ | G+ | Normal | G |
| 12 | 2583 | G | (Light) G | (Open) | G− | G | Normal | F+ |
| 13 | 2691 | G+ | (Light) G− | | G | G | Normal | G− |
| 14 | 2416 | G− | (Light) F+ | (Dense) | F | (Rough) F+ | Gray | (Off Aroma) |
| 15 | 2483 | G | Exc. | | G+ | G | Gray | G+ |
| 16 | 2400 | G− | Exc. | (Open) | F+ | G | Gray | G+ |
| 17 | 2791 | G+ | (Over Baked) | | VG | Smooth | Tan | G+ |
| 18 | 2600 | F+ | Dark | | G− | Rough | Gray | G |

TABLES III-continued

| Bread No. | Average Volume c.c. | Break Shred | Crust Color | BREAD SCORE: Grain | Texture | Crumb Color | Aroma |
|---|---|---|---|---|---|---|---|
| 19 | 2608 | F+ | Dark | G− | Rough | Gray | G+ |
| 20 | 2641 | G | Dark | G− | Rough | Gray | G+ |
| 21 | 2475 | G | Good | G | Rough | Tan | G |
| 22 | 2533 | G− | Good | G | Rough | Tan | G |
| 23 | 2425 | G | Good | F | Harsh | Very Dark | F |
| 24 | 2250 | F | Dark | F | Harsh | Very Dark | F |
| 25 | 2616 | G+ | Good | VG | Silky | VG | G |
| 26 | 2641 | G+ | Light | VG | Silky | VG | G |

P = Poor;
F = Fair;
G = Good;
VG = Very Good;
Exc. = Excellent

That which is claimed is:

1. A method of making standard white bread and characterized by short mixing and fermentation times, and comprising the steps of
    forming a dough by combining bread ingredients for standard white bread including wheat flour, water, leavening agent, and a milk substitute comprising field pea flour and sweet dairy whey, with the pea flour comprising between about one half to three quarters of the milk substitute, and with the amount of the milk substitute being such that the pea flour is present in an amount between about 2% to 3% of the wheat flour by weight,
    mixing the dough,
    fermenting the dough, and then
    baking the dough to form bread.

2. The method as defined in claim 1 wherein the dough forming step includes initially mixing the pea flour and sweet dairy whey to form the milk substitute, and then incorporating the milk substitute into the remaining ingredients.

* * * * *